Dec. 4, 1951            L. H. VON OHLSEN            2,577,094

GENERATOR CONTROL FOR BATTERY CHARGING SYSTEMS

Filed Sept. 2, 1949

INVENTOR
LOUIS H. VON OHLSEN
BY
Blair & Black
ATTORNEYS

Patented Dec. 4, 1951

2,577,094

UNITED STATES PATENT OFFICE 2,577,094

GENERATOR CONTROL FOR BATTERY CHARGING SYSTEMS

Louis H. Von Ohlsen, Hamden, Conn., assignor to The Safety Car Heating & Lighting Co., Inc., New Haven, Conn.

Application September 2, 1949, Serial No. 113,736

8 Claims. (Cl. 320—32)

This invention relates to electrical systems for regulating the output of a variable speed generator and more particularly to systems for increasing the output of a variable speed generator at high generator speeds.

An object of this invention is to increase the efficiency of a generator in supplying power to a load. Another object is to provide an electrical system which will regulate a variable speed generator to increase its output at high speeds. A further object is to provide a system in which a variable speed generator provides a predetermined output at different speeds. Still another object is to provide apparatus which is simple in structure, easy to assemble and repair and efficient and reliable in operation. A still further object is to provide a system for increasing the output of a generator at high speeds so that a smaller generator may be used in a high-speed system. Other objects will be in part obvious and in part pointed out hereinafter.

The invention accordingly consists in the features of construction, combinations of elements and arrangements of parts and in the relation of each of the same to one or more of the others all as will be illustratively described herein, and the scope of the application of which will be indicated in the following claims.

Figure 1:
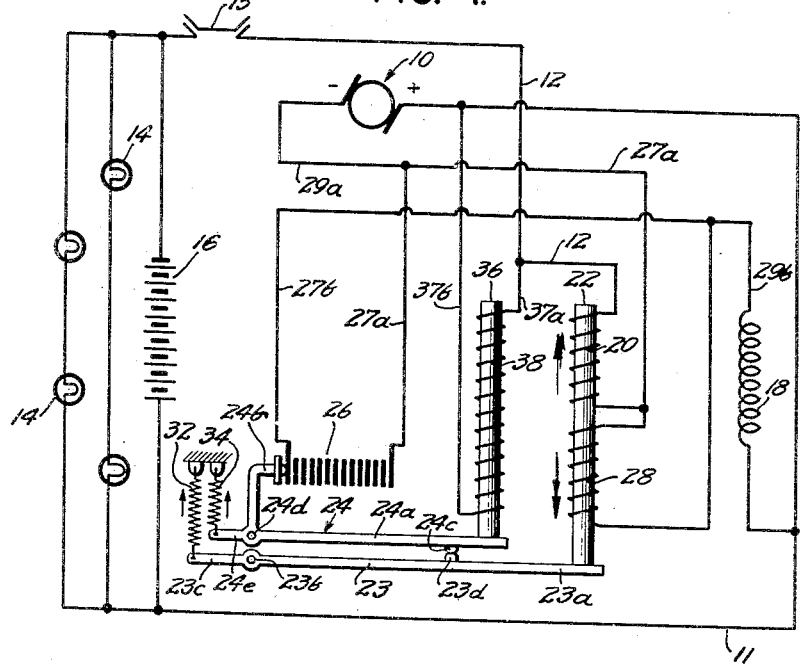
Figure 2:
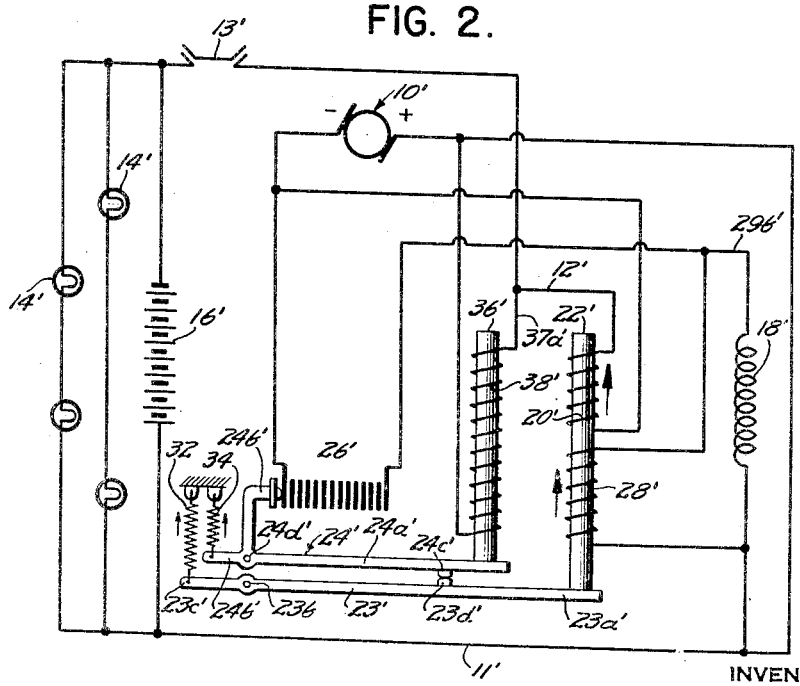

In the accompanying drawings:

Figure 1 diagrammatically represents an electrical circuit and coacting apparatus in which one embodiment of this invention is illustrated; and Figure 2 diagrammatically represents an electrical circuit and coacting apparatus illustrating another possible embodiment of the invention;

Similar reference characters refer to similar parts throughout the several views of the drawings.

In order to provide an adequate power source for all electrical equipment on trains, variable speed generators are used which are mechanically coupled to the car axles. Such generators also recharge the batteries which are used when the trains are stationary or travelling slowly. Sometimes the output of the generators is reduced at high speeds to avoid damaging certain parts of the system. Where, however, the train is to run at high speeds for substantial periods of time, as in the case with many so-called "limited" or express trains, a low capacity generator may be used with provision for increasing its output at high speeds. Thus an adequate power source for all electrical equipment on the car and ample power for charging the batteries may be provided with a smaller and less expensive generator. An object of the present invention is to provide a practical system of the above nature.

Referring to Figure 1 of the drawings, a generator 10 having a shunt field winding 18 is connected to a car axle (not shown) so that its speed varies with the speed of the train. The generator supplies power to a load, such as the lamps 14, and storage battery 16, when the generator voltage is above the battery voltage. A current coil 20 is connected in series with the generator 10, the battery 16 and load 14 and, as will be more fully described hereinafter, controls the output of the generator by way of its core 22. Core 22 is connected to a lever 23 which acts upon one arm 24a of a bell crank generally indicated at 24. The other arm 24b of bell crank 24 acts on a variable resistance member, such as a carbon pile 26, which is in series with the shunt coil 18 across the generator 10. Thus the carbon pile controls the generator voltage within predetermined limits over the wide range of speeds realized by the generator. A modifying coil 28 is also in series with the shunt coil 18 across the generator 10 and acts upon the core 22. The modifying coil 28 modifies the action of the series coil 20 in a manner hereinafter to be described so that the output from the generator is greater at higher speeds than at lower speeds.

More particularly the generator 10, having the shunt field winding 18, is connected by means of generator mains 11 and 12 to the battery 16 and load 14. Load 14 and battery 16 are connected in parallel with each other and in series with the generator. A reverse current relay switch diagrammatically indicated at 13 in main 12 connects the generator to the battery 16 and load 14 when the generator voltage exceeds the battery voltage. When the generator voltage is less than the battery voltage, however, the switch 13 opens and the storage battery 16 supplies current to the load. The construction and operation of switch 13 may be standard or may be similar to that described in copending application 718,989 filed on December 28, 1946, by Labeeb B. Haddad, which issued on January 2, 1951, as Patent Number 2,536,740.

Current coil 20 is also in main 12 in series with the generator 10, and its core 22 is connected to one end 23a of a lever 23. Lever 23 pivots about point 23b and has a balancing spring 32 secured to its other end 23c to thereby oppose upward movement of core 22. A lug 23d on lever 23 bears against a lug 24c on arm 24a of bell crank 24 to pivot bell crank 24 about point 24d against a spring 34 secured to extension 24e of the bell crank.

Arm 24b of bell crank 24 exerts pressure on the carbon pile 26 according to the position of the bell crank; counterclockwise movement of the bell crank decreases pressure on the pile to increase the resistance thereof while clockwise movement of the bell crank produces the reverse effect. The carbon pile is connected by leads 27a and 27b in parallel with the modifying coil 28 and by leads 29a and 29b in series with the shunt coil 18 across the generator 10. The modifying coil 28 is designed and positioned to act upon the core 22 in a direction to oppose the action of the current coil 20. A voltage-responsive coil 38 having a core 36 is connected by leads 37a and 37b across load 14 in series with switch 13. The core 36 is connected to the arm 24a of bell crank 24.

As previously stated, the generator 10 is mechanically coupled to the car axle and rotates with a speed commensurate with the speed of the car. Assuming that the generator voltage exceeds the battery voltage, the control switch 13 closes and the generator supplies current to the load and the storage battery for recharging. Current also flows through the current coil 20 to urge the core 22 upwardly. As a result, the lever 23 and bell crank 24 are pivoted in a counterclockwise direction against the action of the springs 32 and 34, thereby decreasing the pressure upon the carbon pile 26 to increase its resistance. The increase in the resistance of the carbon pile reduces the flow of current through the shunt coil 18 and therefore the voltage generated by the generator 10. For each generator speed, the core 22 reaches a position of balance with springs 32 and 34. This balance determines the resistance value of carbon pile 26 which in turn controls the flow of current through shunt coil 18 and, consequently, the voltage of the generator. The operating characteristics of current coil 20, carbon pile 26 and shunt coil 18 are such that, without modifying coil 28, the generator current would be maintained within relatively narrow limits over a wide range of generator speeds.

As previously stated, the modifying coil 28 is connected in parallel with the carbon pile 26 so as to act upon the core 22 in opposition to the coil 20. Because the resistance of the carbon pile is low at low generator speeds, the drop across the carbon pile is low and therefore the action of the modifying coil in opposition to the series coil 20 is relatively small. As the generator speed increases, however, the resistance of the carbon pile increases and the increased voltage drop across the carbon pile increases the opposition of the modifying coil 28 to the series coil 20. The resultant decrease in the effect of the series coil 20 at higher generator speeds provides a weakening in the force exerted upon the core 22 and therefore a decrease in the resistance value of the carbon pile 26. A greater current therefore flows through the carbon pile 26 and the shunt coil 18 to increase the generator voltage. This increase in the generated voltage at higher speeds provides a greater output for the lamp load 14 and battery 16.

In supplying current to the battery 16, the generator 10 gradually charges the battery, thereby providing a gradual increase in the voltage across the battery. The winding 38, which is connected across the battery 16, also experiences a gradual increase in voltage and accordingly exerts a stronger force on core 36 so as to gradually increase the resistance of the carbon pile 26. Since an increase in the resistance of the carbon pile 26 reduces the current available to the battery 16 and load 14, the voltage coil 38 acts to prevent the battery from being overcharged. As the voltage of the battery 16 approaches that of the generator 10, the voltage coil 38 assumes complete control of the resistance of the carbon pile 26 and the battery 16 thereafter floats upon the line.

The force exerted by the coils 20 and 28 upon the core 22 is dependent not only upon the current flowing through the coils but also upon the position of the core in relation to the coils. Thus, for example, the force which the coils exert upon the core when the coils are centrally located with respect to the core is different from the force which the coils exert when the coils are positioned at the top of the core, assuming that the same currents flow through the coils in both instances. Therefore, if the position of the core is changed for a given generator speed, the current flowing through the coil 20 will be changed before the balance with springs 32 and 34 is established. This change in the position of the core for each generator speed may be obtained by varying the characteristics of the springs 32 and 34. The position of the core may also in effect be changed by varying the length of the core. As a result, in addition to the action of the modifying coil in increasing the output from the generator at higher speeds, the core can be lengthened to obtain an increase in load current from the generator with increase in generator speeds. Furthermore, instead of varying the length of the core, its shape can be varied to obtain the same result.

In Figure 2, the modifying coil 28' is connected in parallel with the shunt coil 18' rather than with the carbon pile 26'. It is also designed and positioned to aid rather than oppose the series coil 20'. Since the resistance of the carbon pile 26' increases with increase in generator speeds, the voltage across the carbon pile 26' also increases. But the voltage across the shunt coil 18' has an approximately inverse relationship to that across the carbon pile 26'. Consequently, the voltage across the shunt coil 18' and the modifying coil 28' decreases as the speed of the generator 10' increases. Therefore, the effect of the modifying coil 28' in lifting the core 22' and thereby increasing the resistance of the carbon pile 26' is greater at low generator speeds. As a result, the current through the shunt coil 18', and consequently the voltage generated by the generator 10', becomes greater as the speed of the generator increases, causing the generator output to increase with increase in generator speeds.

There is thus provided for a variable speed generator a system for increasing the output of the generator with increase in generator speeds. This system accomplishes the desired result in a very simple and, at the same time, efficient manner.

As many possible embodiments may be made of the mechanical features of the above invention and as the art herein described may be varied in various parts, all without departing from the scope of the invention, it is to be understood that all matter hereinabove set forth or shown in the

What is claimed is:

1. In a system for increasing the output of a variable speed generator, the combination of a shunt generator having a shunt connected field circuit including a field coil, a load connected to said generator, a variable resistance member in the field circuit of said generator for controlling the field current to said generator inversely in relation to the speed of the generator, means to vary the resistance of said variable resistance member, a first coil connected in series with said generator and load operatively connected to said means to vary the resistance of said resistance member, and a second coil connected in shunt to a portion of the field circuit of said generator and also operatively connected to said means to modify the action of said first coil upon said variable resistance member to increase current flow through said field coil and consequently the output of the generator at higher speeds.

2. In an electrical system having a variable speed generator and a load wherein the output of the generator to the load is increased at high speeds, the combination of a shunt generator having a shunt connected field circuit including a field coil, a load, a current coil connected in series with said generator and load, a variable resistance member in the field circuit of said generator to control the current flow therethrough, a modifying coil connected in shunt to a portion of said generator field circuit to supplement the action of said current coil to increase the output of said generator at higher generator speeds, and magnetic means operated and physically positioned by the combined effect of said current and modifying coils to vary the resistance of said variable resistance member inversely in relation to the speed of said generator.

3. In a variable speed generator wherein an increase in output is obtained with increase in speeds, the combination of a shunt generator having a shunt connected field circuit, a load connected to said generator, a first coil connected in series with said generator and said load, a second coil in said field circuit serving as a shunt coil in said field circuit for said generator, a third coil connected in series with said second coil in said field circuit across said generator and coupled by magnetic means to said first coil to oppose the action of said first coil, a variable resistance member connected in said field circuit in parallel with said third coil, and lever means mechanically connecting said magnetic means and variable resistance member to increase the resistance of said member with increase in generator speeds.

4. In a variable speed generator wherein an increase in output is obtained with increase in speeds, the combination of a shunt generator having a shunt connected field circuit, a load connected to said generator, a first coil connected in series with said generator and said load, a second coil in said field circuit serving as a shunt coil for said generator, a third coil connected in said field circuit in parallel with said second coil with its magnetic field in assistive relation to the magnetic field of said first coil, a variable resistance member connected in said field circuit in series with said second and third coils across said generator, a core operative by the combined action of the magnetic fields of said first and third coils so as to be positioned in accordance with the currents therethrough, a lever varying the resistance of said member in accordance with the positioning of said core, and means for balancing said lever against the action of said core.

5. A system for obtaining an increased output from a variable speed generator at high generator speeds, including in combination, a shunt generator having a shunt connected field circuit including a field coil, a load supplied by said generator, a variable resistance member in the field circuit of said generator, variably positioned current-responsive means, a lever operatively connecting said current-responsive means and resistance member to vary the resistance of said member in accordance with the position of said current-responsive means, a current coil connected in series with said generator and load with its magnetic field acting upon said current-responsive means to tend to vary the position of the latter, and a modifying coil connected in shunt to a portion of the field circuit of said generator, the magnetic field of said modifying coil being adapted to vary the position response of said current-responsive means to the effect of the magnetic field of said current coil to increase current flow through said field coil and consequently the output of the generator at higher generator speeds.

6. A system for obtaining an increased output from a variable speed generator at high generator speeds, including in combination, a shunt generator having a shunt connected field circuit including a field coil, a storage battery, a variable resistance member in the field circuit of said generator, variably positioned magnetic means, means operative by said magnetic means to vary the resistance of said member in accordance with the position of said magnetic means, a current coil connected in series with said generator and battery to vary the position of said magnetic means, a modifying coil connected in said generator field circuit in shunt with said field coil and in series with said resistance member to act upon and modify the action of said current coil upon said magnetic means so as to increase current flow through said field coil and consequently the generator output with increase in speed, a voltage coil connected across said battery so that its voltage follows the battery voltage, and second magnetic means positioned in accordance with the voltage across said voltage coil and operative upon said resistance member to limit the current flowing through said battery.

7. A system for obtaining an increased output from a variable speed generator at high generator speeds, including in combination, a shunt generator having a shunt connected field circuit including a field coil, a storage battery supplied by said generator, a variable resistance member in the field circuit of said generator, a variably positioned core operative to vary the resistance of said member, a first lever connected to said core so as to be positioned thereby, a second lever operative by said first lever to vary the resistance of said member in accordance with the position of said core, a current coil connected in series with said generator and battery with its magnetic field acting upon said core to tend to vary the position of the latter, a coil connected in shunt to a portion of the field circuit of said generator with its magnetic field being adapted to vary the position response of said core to the effect of the magnetic field of said current coil to increase current flow through said field coil and consequently the generator output at higher generator speeds, a voltage coil connected across said battery whereby its voltage varies in accordance with the battery voltage, and a second core connected to said second lever and operative by said voltage coil to vary the position of said lever so as to limit the current flowing to said battery.

8. A system for obtaining an increased output from a variable speed generator at high generator speeds, including in combination, a shunt generator having a shunt connected field circuit including a field coil, a storage battery supplied by said generator and connected in series with the latter, a load connected across said battery in parallel therewith to be supplied by said generator and said battery, a variable resistance member connected in series with said field coil in the field circuit of said generator, a variably positioned solenoid core, a spring-biased first lever connected to said core so as to be positioned thereby, a spring-biased second lever operable by said first lever and in turn operatively connected to said variable resistance member to vary the resistance thereof in accordance with the position of said core, a current coil connected in series with said generator and the parallel connections through said battery and said load with its magnetic field acting upon said core to tend to vary the position of the latter, a modifying coil shunted around said field coil and in series with said variable resistance member in said field circuit with its magnetic field also acting upon said core to vary the position response of the latter to the effect of the magnetic field of said current coil in assistive relation to increase current flow through said field coil and consequently the generator output at higher generator speeds, a voltage coil connected across said battery and said load in series with said generator, and a second core connected to said second lever and operable by said voltage coil to vary the position of said lever in limitation of the current flowing through said battery.

LOUIS H. VON OHLSEN.

REFERENCES CITED

The following references are of record in the file of this patent:

UNITED STATES PATENTS

| Number | Name | Date |
|---|---|---|
| 1,142,538 | Snee et al. | June 8, 1915 |
| 1,238,896 | Doman | Sept. 4, 1917 |
| 1,251,708 | Turbayne | Jan. 1, 1918 |
| 1,287,331 | Jepson | Dec. 10, 1918 |
| 1,437,247 | Hulse | Nov. 28, 1922 |
| 1,597,315 | Hulse | Aug. 24, 1926 |
| 2,283,738 | Jump | May 19, 1942 |
| 2,427,809 | Rady et al. | Sept. 23, 1947 |
| 2,453,341 | Rady | Nov. 9, 1948 |

FOREIGN PATENTS

| Number | Country | Date |
|---|---|---|
| 496,392 | Great Britain | Nov. 29, 1938 |